July 2, 1946.                M. SCHWARTZ ET AL                2,403,308
                        PHOTOGRAPH CAMERA CONSTRUCTION
                         Filed July 15, 1943         2 Sheets-Sheet 1

INVENTORS
M. Schwartz
W. Castedello
BY
Louis Cooper
ATTORNEY

July 2, 1946.   M. SCHWARTZ ET AL   2,403,308
PHOTOGRAPH CAMERA CONSTRUCTION
Filed July 15, 1943   2 Sheets-Sheet 2
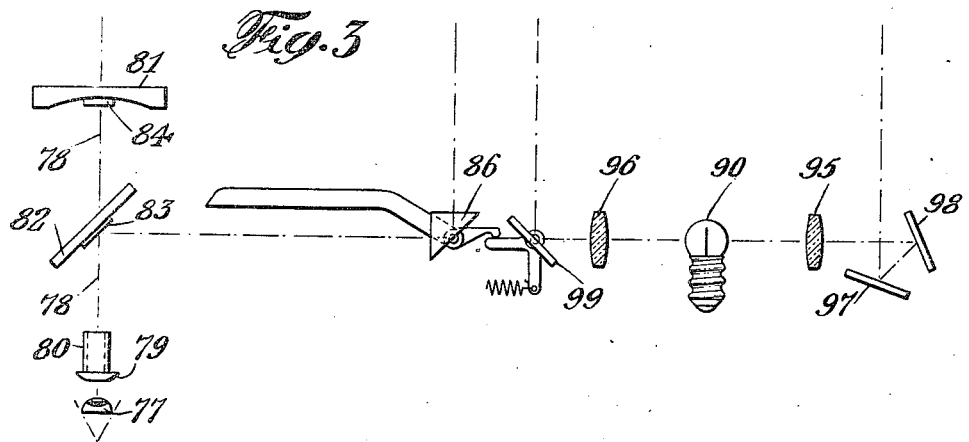
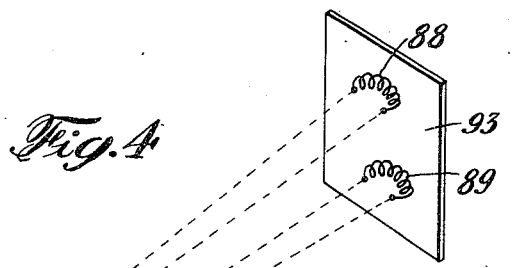
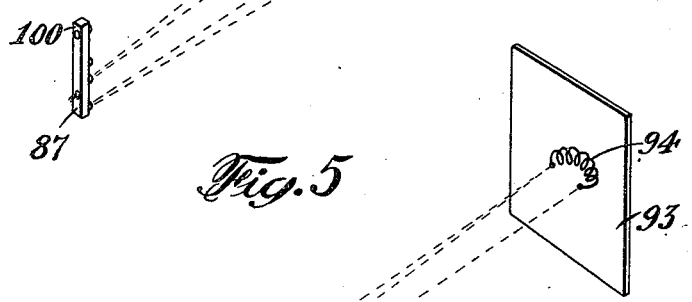
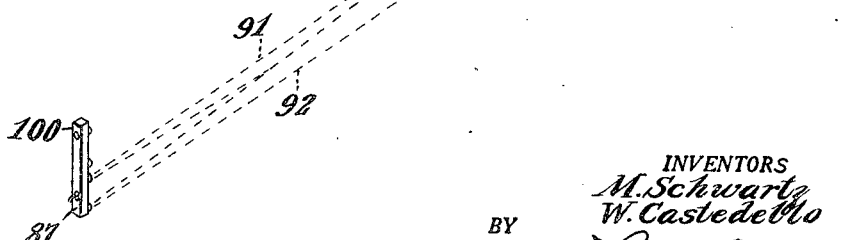
INVENTORS
M. Schwartz
W. Castedello
BY
ATTORNEY Patented July 2, 1946

2,403,308

UNITED STATES PATENT OFFICE 2,403,308

PHOTOGRAPH CAMERA CONSTRUCTION

Morris Schwartz and William Castedello, Stamford, Conn., assignors to The Kalart Company, Inc., New York County, N. Y., a corporation of New York Application July 15, 1943, Serial No. 494,872

4 Claims. (Cl. 95—44)

1

The present invention relates primarily to photographic apparatus and more particularly to an improved arrangement and mechanism for focusing a camera preparatory to the taking of a photograph or a picture. As is well known in the photographic art, it is of extreme importance, in order to take a good photograph having sharp definition, to have the camera properly focused. The focusing of the camera entails the operation of properly positioning the camera lens with respect to the light sensitive negative material relative to the distance of the object being photographed from the camera. It is also highly desirable that the operator of the camera be able to view the exact object or an image thereof being photographed and preferably to do this while focusing the camera and up to the precise time that the camera shutter is tripped. While prior art devices have been provided whereby the focusing of the camera may be accomplished with some degree of satisfaction under certain prescribed conditions, such as under light conditions within predetermined limits, such focusing arrangements fail or are inadequate under conditions such as when the degree of illumination of the object being photographed is insufficient for viewing purposes.

Accordingly, it is one of the primary objects of the present invention to provide a compact arrangement whereby a view of the entire subject matter to be photographed is provided while automatically focusing the subject into sharp definition regardless of the light conditions present under which the subject matter is being viewed.

Another object of the invention in connection with the above is to provide a compact arrangement of the view finder, a lens coupled range finder, and a light beam focusing device so arranged that various ones of the above enumerated units may be employed independently of one another or in a co-operating manner with each other as desired.

Another object of the invention is to provide for the co-operation of a range and view finder whereby no movement of the camera or the head of the operator is required when the operator thereof views the object being photographed through the view finder and/or through the range finder. All that is necessary in one modification of the invention is a slight shift of the operator's eye-ball or the direction of the operator's line of sight to view the object being photographed through the range finder or through the view finder. In another embodiment the shift of the operator's line of sight is not required to shift

2 from the use of one finder to the other. Such an arrangement has the obvious advantage in that no movement of the camera itself is required and the shift from the use of the view finder to the range finder or vice versa may be accomplished practically instantaneously, with full concentration by the operator on the subject to be photographed.

Another object of the present invention is to provide a light beam focusing device which operates simultaneously with and in conjunction with a lens coupled range finder in such a manner that the operation of one of the devices does not interfere with the operation of the other.

A still further object of the invention is to provide a light beam focusing device of increased efficiency whereby sharp focusing may be obtained under light conditions which preclude the use of ordinary focusing devices.

Another still further object of the invention is to provide a light beam focusing device that may be used as a substitute for a range finder of the type described herein.

The above and various other advantages of the present invention will be more apparent when taken in conjunction with the following detailed description of the invention with reference to the accompanying drawings, in which:

Fig. 3 is a second modification of the invention;

Figs. 4 and 5 illustrate diagrammatically the theory of operation of the light beam focusing device.

Figure 1:
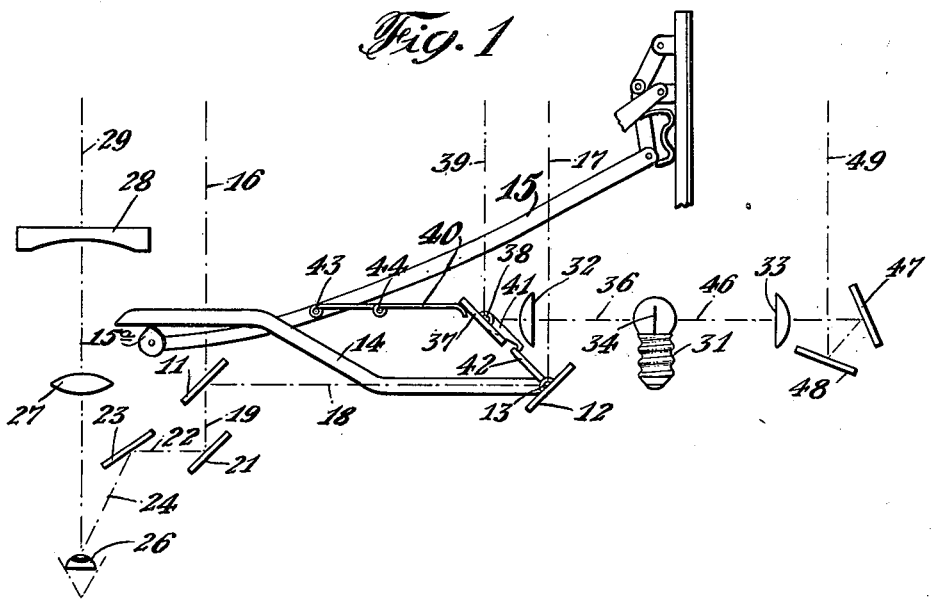
Fig. 1 is a diagrammatic illustration of the arrangement of the present invention showing the manner in which the view finder, the range finder, and the light beam focusing device cooperate.

Referring to Fig. 1, there is shown diagrammatically some of the elements of the range finder together with those of the view finder and a light beam focusing device. The range finder may be of the lens-coupled type such as disclosed in the application of M. Schwartz et al. Serial No. 418,516, filed November 10, 1941, now Patent No. 2,376,082, issued May 29, 1945, which includes a stationary mirror 11 and a movable mirror 12. The stationary mirror 11 is semi-pervious or semi-transparent to light and permits objects to be viewed therethrough and images to be reflected therefrom. The movable mirror 12 is pivoted at the point 13 and its pivoting is effected through a lever arm 14 which may be coupled to the lens of the associated camera so that the mirror pivots in a predetermined relation depending upon the position of the lens relative to the light sensitive negative in the camera. The lever 14 may be operated in a manner similar to that shown in well known prior art patents through a lever 15 adapted to be pivoted during movement of the lens and thereby cause rotation of a cam 15a co-operating with the upper end of the lever 14.

In the employment of the range finder the object to be photographed may be viewed directly through the stationary mirror 11 along some line such as the line 16, while another image of the object to be photographed entering the range finder along the line 17 may be reflected from the movable mirror 12 along a second line 18 to the semi-pervious mirror 11 where it is again reflected along line 19, which line is substantially parallel with the line 16 and may be a continuation of this line. By moving the mirror 12, the direction of the line 17 may be changed and when the mirror is so positioned that the images of the object as viewed along the line 16 and along the line 17 are superimposed upon each other on the stationary mirror 11, the camera is properly focused for the object viewed.

In accordance with the invention, a stationary mirror 21 is so positioned as to be in the path of the line 19 at a location where the eye piece of the usual range finder is located. The mirror 21 is mounted at an angle of approximately 45° to the line 19 and an extension of the line 16, and reflects images viewed along such lines to the left, as shown in Fig. 1, along a line 22. Positioned so as to reflect images viewed along line 22 is a second stationary mirror 23 which is so mounted as to reflect such images along line 22 along the line 24 to some point such as 26 which may be the eye of the operator of the camera. The purpose of the two additional stationary mirrors 21 and 23 in addition to the regular mirrors of the range finder will be more apparent hereinafter.

Mounted in relatively close proximity to the elements comprising the range finder is a view finder of conventional size which may include a first lens 27 and a second lens 28. The object to be photographed may be viewed through the view finder along the line 29 from the point 26 and this line will be substantially parallel with the direct viewing line 16 through the range finder. Since the view finder and the range finder are in close proximity, the lines 16 and 29 will be separated by a relatively small amount and for practical purposes in focusing the camera associated therewith, may be assumed to be directed at the same spot on the object, as the distance between the lines 16 and 29 is minute compared to the distance of the object from the camera under normal conditions.

In using the range finder in conjunction with the view finder, the operator of the camera may view the object being photographed directly through the view finder and so aim the camera that the object being photographed is properly framed. However, the operator at this time will not know whether the camera is properly focused, and in prior art arrangements to properly focus the camera after the object has been properly framed or viewed in the view finder required movement of the camera so that the operator could view the object through the range finder provided the range finder was included on the camera. This movement of the camera or corresponding movement of the operator's head required time and obviously resulted in inconvenience to the operator and possibly inferior results, as the object might have moved between the time it was framed and the range determined and the camera set in accordance therewith. This disadvantage is entirely eliminated in the present invention as the view finder and the range finder are so arranged as to co-operate with one another without the necessity of moving the camera or the operator's head with respect thereto. In this respect the range finder and view finder are so arranged as to co-operate in such a manner that substantially the same objects viewed therethrough merge at a common point such as the point 26 of Fig. 1. Accordingly, after the operator has properly framed the object to be photographed through the instrumentality of the view finder including lenses 27 and 28, all that is necessary is a slight shift in direction of sight so that the operator will look along a line such as 24 instead of along the line 29. This slight shift in the direction of sight of the operator may be accomplished substantially instantaneously and requires no movement of the camera or its co-operating parts. After the operator has properly framed the object and then shifted his sight to the line 24, the camera may be focused in the usual manner to bring the two images of the object in superimposed relation as they will appear on the mirror 23 when the camera is in proper focus. The operator then may again shift his sight back to the view finder to check on the framing of the object, and if conditions have not materially changed during the focusing, he may then trip the lens shutter. Before tripping the shutter the operator may, if desired, recheck the range and the framing as frequently as desired up to the time of tripping the camera shutter. Thus it is apparent from the present arrangement that no movement of the head of the operator or the camera itself is required for properly focusing the camera and framing the object to be photographed but merely a slight shift in the direction of sight of the operator. As this may be accomplished without effecting an appreciable loss in time or effort on the part of the operator, it results in an improved use of the camera. The above arrangement has the further advantage that the view finder may be employed to aim the camera since range finders of the type usually employed in conjunction with cameras have a somewhat limited field of view and accordingly some time will be consumed in properly aiming the camera by means of the range finder.

In order to facilitate the aiming and focusing of the camera under light conditions which are insufficient or such as to preclude the normal use of the range finder, a light beam focusing arrangement is incorporated to be used jointly or independently of the range finder in combination with the view finder. The light beam focusing device may be generally of the type disclosed in the copending application of M. Schwartz, Serial No. 438,350, filed April 9, 1942. However, the light beam focusing device of the present invention has, as hereinafter pointed out, several important advantages over that disclosed in said copending application. In accordance with the present invention the light beam focusing device includes a light bulb 31, Fig. 1, centrally positioned with respect to a pair of lenses of same focal length 32 and 33. Light from the filament 34 of the bulb 31 along the line 36 passes through the lens 32 onto a mirror 37. The mirror 37 is pivotally mounted at the point 38 and is positioned at an angle of approximately 45° to the line 36. Accordingly the light emitted from the left hand side of the bulb 31 along the line 36 is reflected along the line 39 in the general focusing direction of the camera. The direction of the light beam or line 39 from the mirror 37 is varied within limits by means about to be described. Adapted to pivot with the mirror 37 is an arm 41 which co-operates with an arm 42 pivotable with the control lever 14 of the range finder. The arms 41 and 42 are substantially of the same length and accordingly the mirror 12 of the range finder and the mirror 37 of the light beam focusing device pivot substantially equal amounts by means of the lever 14 when the camera lens is moved during focusing of the camera. The mirrors 12 and 37 pivot in opposite directions during movement of the lever 14. A spring 40 mounted at points 43 and 44 has the free end thereof engaged with the back of the mirror 37 to pivot the same in a clockwise direction and holds the end of the arm 41 in contact with the arm 42.

The light beam emitted from the right hand side of the bulb 31 passes along the line 46 through the lens 33 to a stationary mirror 47 and is reflected therefrom onto another stationary mirror 48 and then along line 49 in a direction parallel to the line 16 from the range finder. The two mirrors 47 and 48 are so arranged in conjunction with the lens 33 that an outline of the filament 34 of the bulb is directed along the line 49 similar to the image of the filament directed from the mirror 37 along the line 39. By means of the two lenses 32 and 33 and the pair of mirrors 47 and 48, the images of the filament 34 of the light bulb 31 directed along the lines 39 and 49 are substantially identical and one is not inverted with respect to the other as they would be if only a single mirror was employed in place of the two mirrors 47 and 38.

If the operator of the camera desires to take a photograph under light conditions which preclude the use of the range finder or make use thereof difficult, the light bulb 31 may be illuminated, which causes the projection of two light beams 39 and 49 from the light beam focusing device. These light beams are directed in the general focusing direction of the camera but the direction of one is changeable as a result of an operation of the range finder or movement of the camera lens. Movement of the lens of the camera which pivots the range finder mirror 12 will also pivot the mirror 37 to change the direction of the line 39 with respect to the fixed light beam line 49. With the range finder properly adjusted, the lines 39 and 49 will intersect at the point at which the camera is focused. Thus all that is necessary to change from the use of the range finder to the use of the light beam focusing device is to illuminate the light bulb 31 and adjust the camera lens until the two projected beams intersect on the object being photographed. Both the range finder and the light beam focusing device may be employed simultaneously or either one may be employed separately and correct focusing of the camera is insured with either. As soon as the two projected outlines of the filament 34 of the bulb are directly superimposed upon each other, the camera is properly focused. By projecting two images of the light bulb filament, they can be brought into exceedingly close coincidence with one another and corresponding close focusing of the camera will result. This arrangement is much superior to prior art arrangements wherein only spots of light or light beams are employed, and has the further advantage over prior art arrangements employed in conjunction with double-view range finders in that the efficiency of the light beam employed is not decreased in passage through a semi-pervious mirror as is employed in such types of range finders.

The light beam focusing device may be employed in conjunction with the view finder with the same efficiency as that with which the range finder may be employed. The object being photographed may be framed through the view finder in the usual manner and the operator may simultaneously move the camera lens to bring the two projections of the light bulb filament into coincidence while sighting the object through the view finder. In this instance no shifting of the line of sight is required as the projections of the filaments may be observed through the view finder.

In the preferred embodiment of the light beam focusing arrangement, the bulb 31 preferably has a good light output and a filament of the type shown in the projections thereof in Figs. 4 and 5. Likewise the bulb 31 is so positioned that the axis of the convolutions of the filaments are substantially perpendicular to the lines 36 and 46 and similar side views of the convolutions of the filament will be reflected from the mirrors employed.

Figure 2:
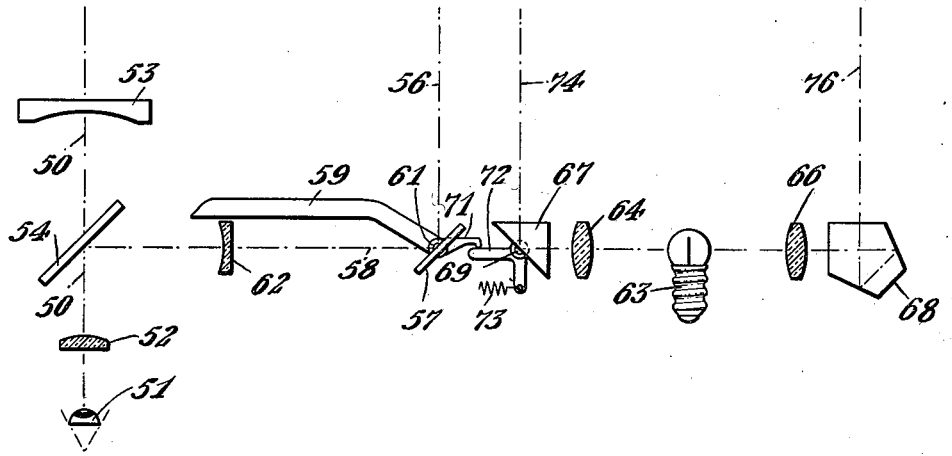
Fig. 2 is a modification of the invention.

In the modification of the invention shown in Fig. 2 the view finder and range finder are arranged so that they both may be employed simultaneously and no change in the direction of the line of sight of the operator or movement of the camera is required to change from the use of one to the other. In Fig. 2 the operator with his eye at a point such as 51 may view and frame the object to be photographed along the line 50 through the view finder which may include the usual view finder lenses 52 and 53. It will be noted that a mirror 54 is in the line of sight 50 but since the mirror is semi-pervious to light, it permits the object to be viewed therethrough and corresponds in this respect to the stationary mirror 11 included in the range finder of Fig. 1. When the range finder is used in conjunction with the view finder, an image of the object being photographed will enter the range finder along the line 56, Fig. 2, and be reflected from the movable mirror 57 along the line 58 to the mirror 54 and then substantially parallel to the line 50 to the operator's eye 51. The movable mirror 57 is controlled by and coupled to the camera lens (not shown) to pivot in accordance with the movement of the camera lens in the usual manner by means of the lever 59, both the mirror 57 and lever 59 pivoting about the point 61.

The range finder may include a lens 62 if desired of somewhat similar characteristics to the lens 53 of the view finder but preferably substantially smaller. Only a small part of the field that may be viewed through the view finder enters the range finder along the line 56 and hence only this small portion of the field is reflected from the movable mirror 57 along the line 58 through the lens 62 to the semi-pervious or semi-transparent mirror 54. Accordingly this small portion of the total field of the view finder does not materially affect the use of the view finder in aiming the camera and framing the object to be photographed. Thus when the arrangement of Fig. 2 is employed, the camera may be aimed and the object properly framed by means of the view finder in the usual manner of employing view finders, and while so aiming the camera and framing the object, the camera lens (not shown)

may be moved so as to control the range finder to bring an image of a portion of the object into superimposed relation on the mirror 54 with its corresponding portion of the field as viewed through the view finder. When this occurs, the camera is properly focused on the object and also properly aimed so that the image will be correctly framed. Accordingly, by the arrangement of Fig. 2, a view finder and range finder are adapted to co-operate with each other and in such a manner that neither interferes in any material respect with the other. Obviously the arrangement is highly desirable and enables the operation of the camera to more closely supervise the aiming and focusing of the camera. No movement of the camera or the line of sight of the operator is required to change from the use of the view finder separately to its use in conjunction with the range finder. Such an arrangement is particularly advantageous when the operator is photographing moving objects since under such conditions there may be little time available for focusing and framing.

A light beam focusing device may also be employed in conjunction with the modification of Fig. 2 and such a device may include a light bulb 63, lenses 64 and 66, a right angle prism 67 and a pentaprism 68. The pentaprism 68 is fixedly mounted while the right angle prism 67 is pivotally mounted at 69. The prism 67 is adapted to pivot during the pivoting of the mirror 57 of the range finder through the action of arms 71 and 72, the prism 67 pivoting oppositely to the pivoting of the mirror 57. A spring 73 maintains the arms 71 and 72 in engagement. By means of the light beam focusing device two images or outlines of the filament of the light bulb 63 are directed outwardly along the lines 74 and 76 and one image will not be inverted with respect to the other since the pentaprism 68 inverts the image passing therethrough. The filament of the bulb 63 is preferably of the same type as the filament 34 of the bulb 31. When employing the light beam focusing device instead of the range finder, for example, when the light conditions are such as to preclude the use of the range finder or make it inconvenient, the control of the light beam focusing device may be effected in substantially the same manner as described in connection with the arrangement of Fig. 1. Also, the view finder may be employed in conjection with the light beam focusing device in a manner similar to that described in connection with Fig. 1.

The physical dimensions of the light beam focusing device with respect to the range finder should be such that the distance between the lines 74 and 76 when said lines are parallel is substantially equal to the distance between the lines 50 and 56 of the range finder when these lines are parallel. Similarly, the physical dimensions of the range finder of Fig. 1 with respect to the light beam focusing device thereof should be such that the distance between the lines 16 and 17 when parallel is substantially equal to the distance between the lines 39 and 49 when parallel. Obviously the prisms 67 and 68 of Fig. 2 could be used instead of the mirrors 37, 47 and 48 of Fig. 1 if desired, or vice versa. When a prism such as 68 is employed, the two reflecting surfaces are fixed relative to one another which simplifies the mounting in some cases.

The modification of the invention shown in Fig. 3 is somewhat similar to that of Fig. 2 but has certain advantages thereover. In Fig. 3 the eye of the operator at 77 views along line 78 the object to be photographed through the view finder, including the lens 79 mounted on a metal tube 80 and the lens 81. The line 78 passes further through a glass 82. Part of this glass 82 preferably is a semi-pervious or semi-transparent mirror, the rest of the glass being clear. The part of the glass 82 semi-transparent may be circular and located at the center of the glass 82, such as the section 83 thereof. Also, the lens 81 of the view finder may have a section 84 flat on one side at the center thereof for neutralizing the effect of the lens 81 in this section and retaining the natural size of part of the image viewed through the view finder. With only a small part such as 83 of the glass 82 semi-transparent, the efficiency of the view finder is not impaired to any extent when employed in connection with a range finder in the manner shown in Fig. 3. The range finder of Fig. 3 may operate in stubstantially the same manner as the range finders of Figs. 1 and 2 and may employ a movable right angle prism 86 instead of a movable mirror. Likewise, the light beam forcusing device of Fig. 3 having an incandescent lamp 90 with a filament like that of lamps 31 and 63 of Figs. 1 and 2, a pair of lenses 95 and 96, stationary mirrors 97 and 98, and a pivotable mirror 99, may be substantially similar in construction and operation to the light beam focusing devices of Figs. 1 and 2.

Fig. 4 illustrates diagrammatically the operation of a light beam focusing device coupled with a range finder 100. The focusing device is indicated generally by reference numeral 87, with the focusing device projecting two images 88 and 89 of the lamp filament along lines 91 and 92 respectively when the said images do not coincide on the object 93. This condition would indicate that the camera is not properly focused for an object at such a distance. Thereupon the operator operates the focusing mechanism until the two images such as 88 and 89 merge together for a single image such as 94, Fig. 5, on the object 93. When the two images merge or are superimposed upon each other, the camera will be correctly focused for the object 93. Since the non-deflecting beam projected from the light beam focusing device is substantially parallel to the camera lens and only separated from the camera lens by a short distance, the merged images will be substantially at the center of the area to be photographed. This, of course, assists in aiming the camera.

As clearly shown in Fig. 4, the two projected images or outlines of the lamp filament of the light beam focusing device are both in all substantial respects identical to each other and neither is inverted with respect to the other since one image is inverted in the light beam focusing device before it is projected. Thus the two projected images can be superimposed very accurately and the camera focused with a corresponding exactitude.

While the invention has been described in a preferred and two modified embodiments, it will be apparent that various other modifications can be made without departing from the spirit or essential attributes thereof, and it is desired therefore that only such limitations be placed thereon as are imposed by the prior art or are specifically set forth in the appended claims.

What is claimed is:

1. A camera focus indicating device consisting of a viewing range finder of the double object lens coupled type having a mirror movable in accordance with the focusing movement of the camera lens, a double light beam projecting range finder having an incandescent lamp having a concentrated filament, means including fixed and movable reflecting surfaces for projecting a pair of images of said lamp filament in the general focusing direction of the camera, means including arms movable with said movable reflecting surfaces for coupling the said surfaces whereby the direction of one of said projected images is simultaneously changed with and in accordance with the change of direction of one of the object viewing lines of said range finder and means for projecting said lamp filament images independently of the viewing lines of said range finder and so that neither of said filament images is inverted with respect to the other.

2. In a camera focus indicating device, an incandescent lamp having a concentrated filament, a movable reflecting surface at one side of said lamp for projecting an image of one side of said filament, a pair of fixed reflecting surfaces at the other side of said lamp for projecting an image of the opposite side of said filament in the general direction of projection of said first image, a range finder having a movable reflecting surface adapted to superimpose a reflected image of the subject to be photographed onto an image thereof as viewed directly through said range finder, means for controlling the movement of said movable reflecting surface of said range finder in accordance with the focusing movement of a camera lens and means connecting the movable reflecting surface of said range finder with the movable reflecting surface associated with said lamp so that said reflecting surfaces move in unison whereby said two projected lamp filament images merge on an object that has images thereof superimposed as viewed directly through said range finder.

3. In a camera focusing device, a viewing range finder of the double object type and having a movable reflecting surface, means for moving said reflecting surface in accordance with the focusing movement of a camera lens, a projecting range finder for projecting a pair of lamp filament images also including a movable reflecting surface, separate members associated with each of said movable reflecting surfaces and movable therewith, said members engaging each other and means including said members to move the movable reflecting surface of said projecting range finder in synchronism with the movement of the movable reflecting surface of said viewing range finder whereby said two range finders are operated simultaneously.

4. In a camera focus indicating device, an incandescent lamp having a filament, a movable reflecting surface at one side of said lamp for projecting an image of one side of said filament, a pair of fixed reflecting surfaces at the other side of said lamp for projecting an image of the opposite side of said filament in the general direction of projection of said first image, a range finder having a movable reflecting surface adapted to superimpose a reflected image of the subject to be photographed onto an image thereof as viewed directly through said range finder, means for controlling the movement of said first movable reflecting surface of said range finder in accordance with the focusing movement of a camera lens, and means controlling the angular positions of the movable reflecting surface of said range finder and of the movable reflecting surface associated with said lamp so that said reflecting surfaces move in unison whereby said two projected lamp filament images merge on an object that has images thereof superimposed as viewed directly through said range finder.

MORRIS SCHWARTZ.
WILLIAM CASTEDELLO.